(12) United States Patent
Abe

(10) Patent No.: US 7,742,214 B2
(45) Date of Patent: Jun. 22, 2010

(54) OPTICAL SCANNING DEVICE AND PRINTING APPARATUS

(75) Inventor: Naoki Abe, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 239 days.

(21) Appl. No.: 12/119,176

(22) Filed: May 12, 2008

(65) Prior Publication Data
US 2008/0278784 A1 Nov. 13, 2008

(30) Foreign Application Priority Data
May 10, 2007 (JP) .............................. 2007-125670

(51) Int. Cl.
*G02B 26/08* (2006.01)
(52) U.S. Cl. .................................................. 359/213.1
(58) Field of Classification Search ............. 359/198.1, 359/212.1–215.1; 250/234–236; 358/474, 358/493, 494; 347/243, 259, 260, 233–235
See application file for complete search history.

(56) References Cited

U.S. PATENT DOCUMENTS

| 5,446,556 A | 8/1995 | Kuroiwa et al. |
| 5,668,644 A | 9/1997 | Kuroiwa et al. |
| 2004/0036936 A1* | 2/2004 | Nakajima et al. ............ 359/204 |

FOREIGN PATENT DOCUMENTS

| JP | 52-150642 A | 12/1977 |
| JP | 01-302315 | 12/1989 |
| JP | 05-127109 | 5/1993 |
| JP | 2001-311901 | 11/2001 |
| JP | 2002-078368 | 3/2002 |
| JP | 2003-215493 A | 7/2003 |
| JP | 2005-292628 A | 10/2005 |
| JP | 2006-220745 A | 8/2006 |
| JP | 2006-320963 A | 11/2006 |
| JP | 2007-086626 A | 4/2007 |
| JP | 2007-245246 A | 9/2007 |

OTHER PUBLICATIONS

JP Office Action dtd Dec. 16, 2008, JP Appln. 2007-125670 (partial English Translation).

* cited by examiner

*Primary Examiner*—Euncha P Cherry
(74) *Attorney, Agent, or Firm*—Banner & Witcoff, Ltd.

(57) ABSTRACT

An optical scanning device comprises: an oscillating mirror which has a pair of electrodes and a mirror oscillator; a driving unit which applies a wave-like driving signal to the electrodes so as to oscillate the mirror oscillator correspondingly to the driving signal; a detecting unit which detects an oscillation amplitude of the oscillating mirror; an adjusting unit which changes a value of at least one of a duty ratio, a driving frequency, an amplitude, and a bias voltage of the driving signal as a parameter so as to adjust the oscillation amplitude detected by the detecting unit to a target value; and a storing unit which stores the value of the parameter changed by the adjusting unit as a reference value, wherein when the oscillating mirror is activated, the adjusting unit starts the adjusting of the oscillation amplitude with using the driving signal based on the reference value.

13 Claims, 7 Drawing Sheets

OPTICAL SCANNING DEVICE AND PRINTING APPARATUS

CROSS-REFERENCE TO RELATED APPLICATION

This application claims priority from Japanese Patent Application No. 2007-125670, filed on May 10, 2007, the entire subject matter of which is incorporated herein by reference.

TECHNICAL FIELD

Aspects of the present invention relate to an optical scanning device including an oscillating mirror and a printing apparatus.

BACKGROUND

Optical scanning devices which are disposed in a laser printer and the like use a polygon mirror rotated by a motor, or an oscillating mirror (resonance mirror) as described in JP-A-5-127109. For example, an oscillating mirror includes a mirror oscillator coupled to a frame portion through a support shaft portion (torsion beam). A movable electrode is disposed on the mirror oscillator, and a stationary electrode is disposed on the frame portion. An optical scanning device using the oscillating mirror comprises a driving circuit which applies a wave-like driving signal (for example, a sinusoidal signal) to the movable electrode or the stationary electrode. Accordingly, the mirror oscillator is caused to oscillate by an electrostatic force which is periodically produced between the movable electrode and the stationary electrode, and a restoring force of the support shaft portion which is elastically deformed by the electrostatic force. When a laser beam is applied from a light source on the oscillating mirror oscillator, the laser beam reflected by the oscillating mirror is periodically scanned over a photosensitive member.

Regarding the oscillating mirror, even if a driving signal of the same level is given from the driving circuit to the electrodes, an oscillation amplitude (oscillation angle range) of the oscillating mirror fluctuates when the ambient temperature or the like is varied. When the oscillation amplitude of the oscillating mirror fluctuates, the scan width of the laser beam on the photosensitive member is changed. Therefore, the optical scanning device described in JP-A-5-127109 includes an optical sensor which receives the laser beam reflected from the oscillating mirror. Then, the oscillation amplitude of the oscillating mirror is adjusted so as to be maintained constant by a feedback control in which a detection time difference of the laser beam by the optical sensor is compared with a predetermined reference time.

SUMMARY

However, according to the configuration in which the amplitude of an oscillating mirror is adjusted by a feedback control as described in JP-A-5-127109, when the oscillating mirror is activated, the adjustment of the oscillation amplitude is started with a driving signal of a value which is always fixed. Therefore, it could take a long time for the driving signal to reach an optimum value at which the oscillation amplitude of the oscillating mirror becomes a target value.

Exemplary embodiments of the present invention address the above disadvantages and other disadvantages not described above. However, the present invention is not required to overcome the disadvantages described above, and thus, an exemplary embodiment of the present invention may not overcome any of the problems described above.

Accordingly, it is an aspect of the present invention to provide an optical scanning device and printing apparatus in which oscillation at activation of an oscillating mirror can stabilize earlier.

According to an exemplary embodiment of the present invention, there is provided an optical scanning device comprising: an oscillating mirror which has a pair of electrodes and a mirror oscillator, and which deflects a light beam; a driving unit which applies a wave-like driving signal to the pair of electrodes so as to oscillate the mirror oscillator by an electrostatic force corresponding to the driving signal; a detecting unit which detects an oscillation amplitude of the oscillating mirror; an adjusting unit which changes a value of at least one of a duty ratio, a driving frequency, an amplitude, and a bias voltage of the driving signal as a parameter so as to adjust the oscillation amplitude detected by the detecting unit to a target value; and a storing unit which stores the value of the parameter changed by the adjusting unit as a reference value, wherein when the oscillating mirror is activated, the adjusting unit starts the adjusting of the oscillation amplitude with using the driving signal based on the reference value stored in the storing unit.

According to another exemplary embodiment of the present invention, there is provided a printing apparatus comprising: a photosensitive member; an optical scanning device a printing unit. The optical scanning device is activated in response to a print request, and comprises: an oscillating mirror which has a pair of electrodes and a mirror oscillator, and which deflects a light beam to be exposed on the photosensitive member; a driving unit which applies a wave-like driving signal to the pair of electrodes so as to oscillate the mirror oscillator by an electrostatic force corresponding to the driving signal; a detecting unit which detects an oscillation amplitude of the oscillating mirror; an adjusting unit which changes a value of at least one of a duty ratio, a driving frequency, an amplitude, and a bias voltage of the driving signal as a parameter so as to adjust the oscillation amplitude detected by the detecting unit to a target value; and a storing unit which stores the value of the parameter changed by the adjusting unit as a reference value, wherein when the oscillating mirror is activated, the adjusting unit starts the adjusting of the oscillation amplitude with using the driving signal based on the reference value stored in the storing unit. The printing unit forms an image on the exposed photosensitive member and transfer the image to a recording medium.

According to a further exemplary embodiment of the present invention, there is provided an optical scanning device comprising: an oscillating mirror which oscillates rotationally; a driving unit which applies a driving signal to the oscillating mirror to oscillate; a detecting unit which detects an oscillation amplitude of the oscillating mirror; a controller which controls a waveform of the driving signal to adjust the oscillation amplitude of the oscillating mirror to a target value based on a detection result of the detecting unit; a storing unit which stores a waveform data indicating the waveform of the driving signal which is obtained in the control by the controller, as a reference data; a receiving unit which receives a control start command and a control stop command, wherein, in response to the control start command, the controller starts controlling of the waveform of the driving signal to adjust the oscillation amplitude, based on the reference data stored in the storing unit.

BRIEF DESCRIPTION OF THE DRAWINGS

The above and other aspects of the present invention will become more apparent and more readily appreciated from the following description of exemplary embodiments of the present invention taken in conjunction with the attached drawings, in which.

DETAILED DESCRIPTION

First Exemplary Embodiment

A first exemplary embodiment of the present invention will be described with reference to FIGS. 1 to 6. The exemplary embodiments will be described in relation to a laser printer. However, the inventive concept of the present invention also applies to other apparatus such as a display apparatus, a projector, a scanner and bar code reader or the like.

(Overall Configuration of Laser Printer)

Figure 1:
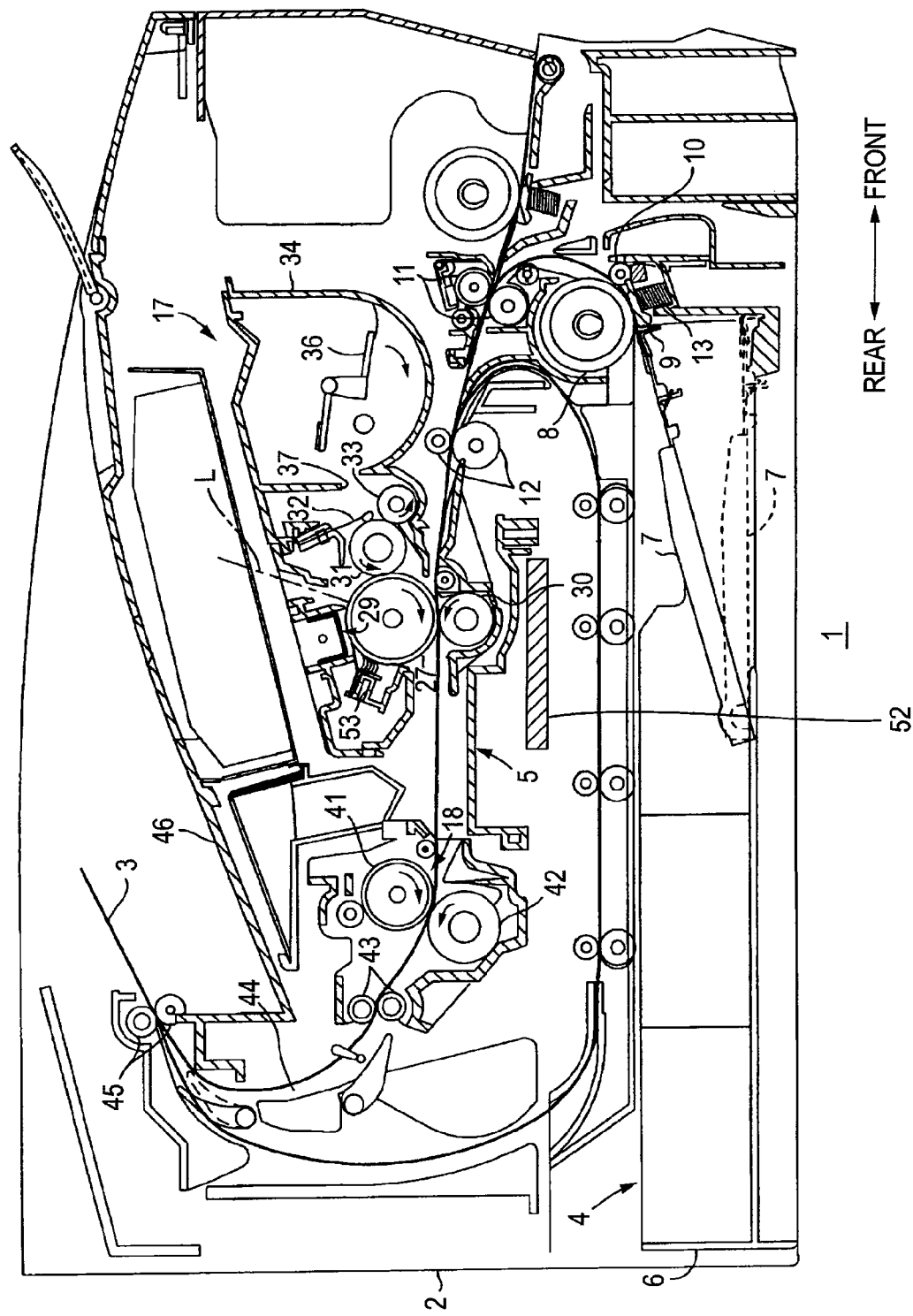
FIG. 1 is a side sectional view of a laser printer according to a first exemplary embodiment of the present invention.

FIG. 1 is a side sectional view of a laser printer 1. The laser printer 1 (printing apparatus) includes a feeder unit 4 which feeds a sheet 3 (recording medium), and a printing unit 5 which forms an image on the sheet 3 fed by the feeder unit 4, in a body frame 2.

(1) Feeder Unit

The feeder unit 4 includes a sheet feeding tray 6, a sheet pressing plate 7, a feed roller 8, a separation pad 9, paper dust removing rollers 10, 11, and a registration roller 12. The separation pad 9 is pressed against the feed roller 8 by a spring 13. Hereinafter, the description will be made assuming that the right side of the sheet in FIG. 1 is the front side of the laser printer 1, and the left side of the sheet in FIG. 1 is the rear side of the laser printer 1. The sheet pressing plate 7 is swingable about a rear end portion thereof, and a front end side is upwardly urged by a spring (not shown). Therefore, the uppermost sheet 3 among the sheets 3 placed on the sheet pressing plate 7 is pressed toward the feed roller 8. The sheets 3 on the sheet pressing plate 7 is nipped by the feed roller 8 and the separation pad 9 along the rotation of the feed roller 8, and then fed one by one. The fed sheet 3 is subjected to paper dust removal by the paper dust removing rollers 10, 11, and then sent to the registration roller 12. Thereafter, the registration roller 12 sends the sheet 3 to a transferring position. In the transferring position, a toner image on a photosensitive drum 27 is transferred to the sheet 3, and the photosensitive drum 27 (photosensitive member) contacts a transfer roller 30 (transferring unit).

(2) Printing Unit

The printing unit 5 includes a scanner unit 16, a process cartridge 17, and a fixing unit 18.

Figure 2:
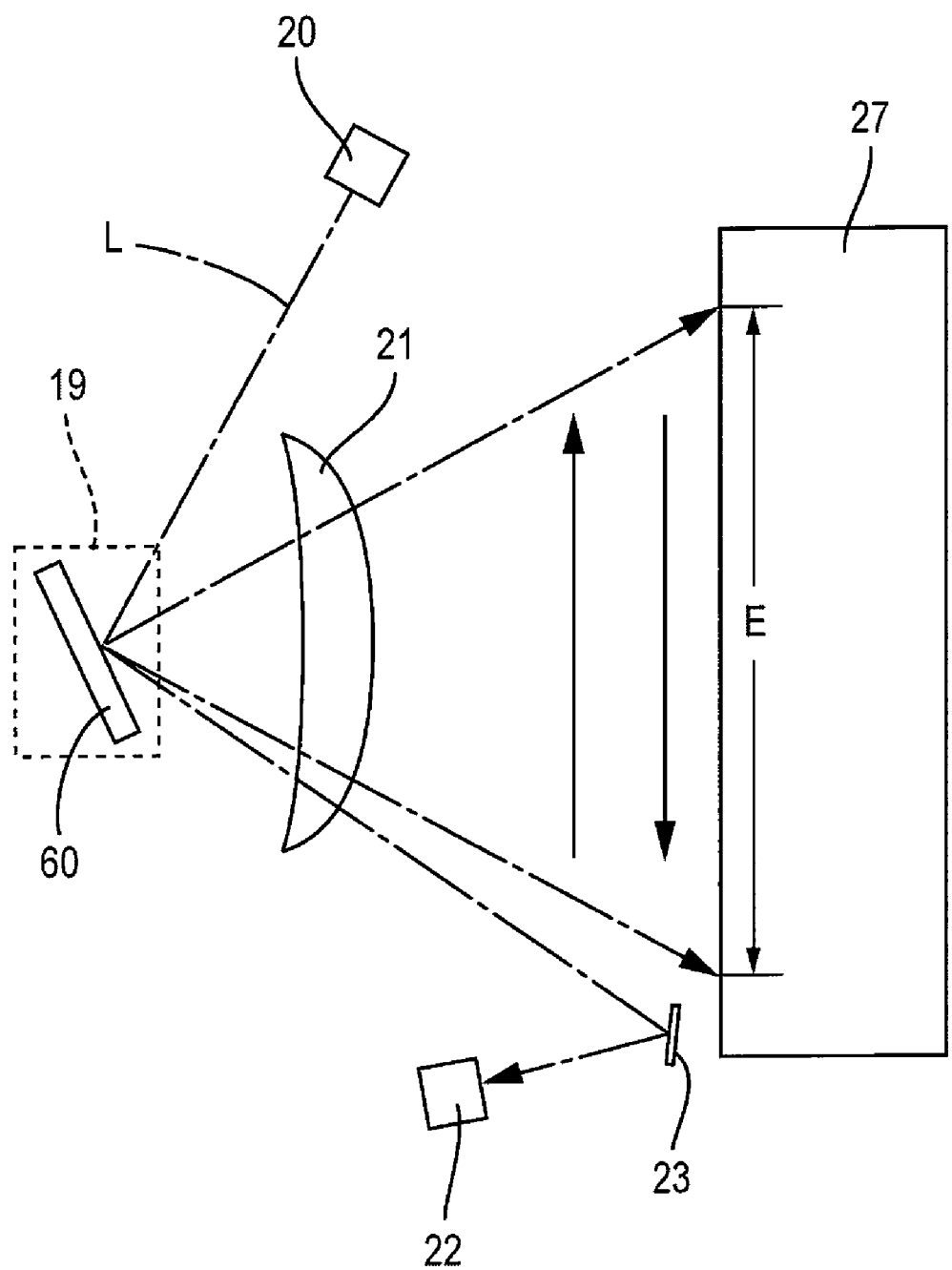
FIG. 2 is a diagram showing a configuration of a scanner unit according to the first exemplary embodiment.

FIG. 2 is a diagram showing the configuration of the scanner unit 16 (optical scanning device). A semiconductor laser 20 performs on-off operations on the basis of an image signal. A laser beam (light beam) L emitted from the semiconductor laser 20 is deflected by an oscillating mirror 19 as indicated by a chain line. The laser beam L which is deflected by the mirror passes through an optical system 21, for example, including a scanning lens or a cylindrical lens to be imaged on the surface of the photosensitive drum 27, thereby forming an electrostatic latent image in a printing region E on the surface of the photosensitive drum 27. A BD sensor 22 is disposed in the scanner unit 16. The BD sensor 22 (optical sensor) detects the laser beam L that has passed through the optical system 21 at a predetermined position. Specifically, the scanner unit 16 is configured so that the laser beam L that has passed through the optical system 21 incidents on the BD sensor 22 through a reflecting mirror 23.

The detection timing of the laser beam L in the BD sensor 22 is used for measuring the timing of starting illumination of the laser beam L on the printing region E. The time interval of the detection timing (hereinafter, such interval is referred to as "detection time interval") is used for detecting the oscillation amplitude W of the oscillating mirror 19 as described later. The oscillating mirror 19 will be described in detail later.

The process cartridge 17 includes a developing roller 31, a layer-thickness restricting blade 32, a supplying roller 33, and a toner hopper 34. A toner in the toner hopper 34 is stirred by an agitator 36, and then discharged from a toner supply port 37. During a developing process, a developing bias voltage is applied to the developing roller 31 by a bias applying circuit (not shown).

The toner discharged through the toner supply port 37 is supplied to the developing roller 31 by rotation of the supplying roller 33, and frictionally positively charged between the supplying roller 33 and the developing roller 31. The toner supplied onto the developing roller 31 is carried in the form of a thin layer on the developing roller 31 with the layer-thickness restricting blade 32.

The process cartridge 17 further includes the photosensitive drum 27, a scorotron charging device 29, the transfer roller 30, and a cleaning brush 53. The surface of the photosensitive drum 27 is positively charged by the charging device 29, and then exposed by the laser beam L emitted from the scanner unit 16, thereby forming an electrostatic latent image.

Next, the toner carried on the surface of the developing roller 31 is supplied to the electrostatic latent image formed on the photosensitive drum 27 to develop the image. During a transferring process, a transferring bias voltage is applied to the transfer roller 30 by a bias applying circuit (not shown). A cleaning bias voltage is applied to the cleaning brush 53, whereby paper powder adhering to the photosensitive drum 27 is electrically attracted to the cleaning brush 53 and removed from the photosensitive drum 27. During a period when the sheet 3 is passed between a heating roller 41 and a pressing roller 42, the fixing unit 18 thermally fixes the toner on the sheet 3. Thereafter, the sheet is conveyed to a discharging path 44 by a conveying roller 43. The sheet 3 which is sent to the discharging path 44 is discharged to a sheet discharging tray 46 by a discharge roller 45.

(Oscillating Mirror)

Figure 3:
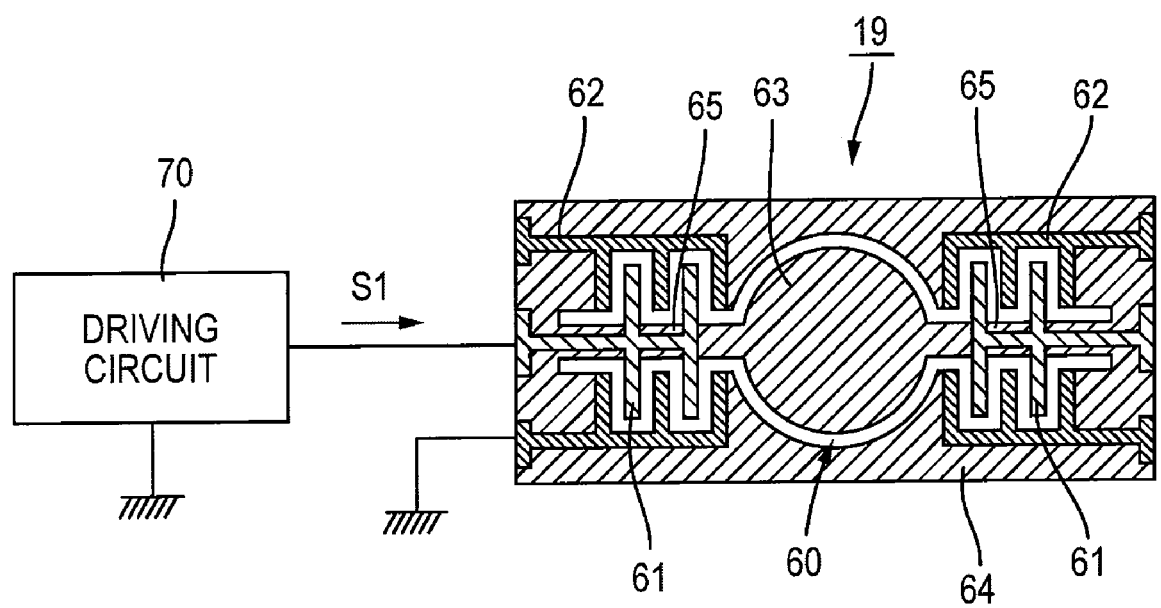
FIG. 3 is an overall view of an oscillating mirror according to the first exemplary embodiment.

FIG. 3 is an overall view of the oscillating mirror 19. The oscillating mirror 19 includes a mirror oscillator 60, and a pair of electrodes including a movable electrode 61 and a stationary electrode 62. The mirror oscillator 60 has a structure in which a circular mirror portion 63 is placed in a frame portion 64, and a pair of support shaft portions 65 extending in an opposite direction from the mirror portion 63 are coupled to the frame portion 64. The mirror oscillator 60 is formed by, for example, applying a process based on the micromachining technique such as etching and film formation on a single semiconductor substrate (e.g., a silicon wafer).

The movable electrode 61 which has a comb-like shape is disposed on each of the support shaft portions 65. The movable electrode 61 is formed by vapor-depositing a conductive material onto the support shaft portions 65. By contrast, the stationary electrode 62 which has a comb-like shape is disposed on the frame portion 64. The stationary electrode 62 is formed by vapor-depositing a conductive material onto the frame portion 64. Comb edges of the movable electrode 61 and the stationary electrode 62 are alternately placed so as to interdigitate while forming predetermined gaps therebetween.

A driving circuit 70 (driving unit) gives a pulse-like or wave-like driving signal S1 (voltage signal) between the movable electrode 61 and the stationary electrode 62. The driving signal has a rectangular waveform. Specifically, the driving signal S1 is given to the movable electrode 61, and the stationary electrode 62 is grounded. According to this configuration, the mirror portion 63 of the oscillating mirror 19 oscillates by an electrostatic force (an attractive force or a repulsive force) which is periodically produced between the movable electrode 61 and the stationary electrode 62, and a restoring force of the support shaft portion 65 which is torsionally deformed by the electrostatic force.

In the following description, it is assumed that a position where the mirror portion 63 is flush with the frame portion 64 is a natural position. In other words, the position of the mirror portion 63 when the support shaft portion 65 is in a natural state. And, an oscillation angle in the case where the mirror portion 63 is rotated from the natural position in one rotation direction is a positive angle, and the oscillation amplitude W of the mirror portion 63 at this time is positive. Additionally, an oscillation angle in the case where the mirror portion is rotated from the natural position in the other rotation direction (the direction opposite to the one direction) is a negative angle. The oscillation amplitude W of the mirror portion 63 at this time is assumed to be negative.

Figure 4:
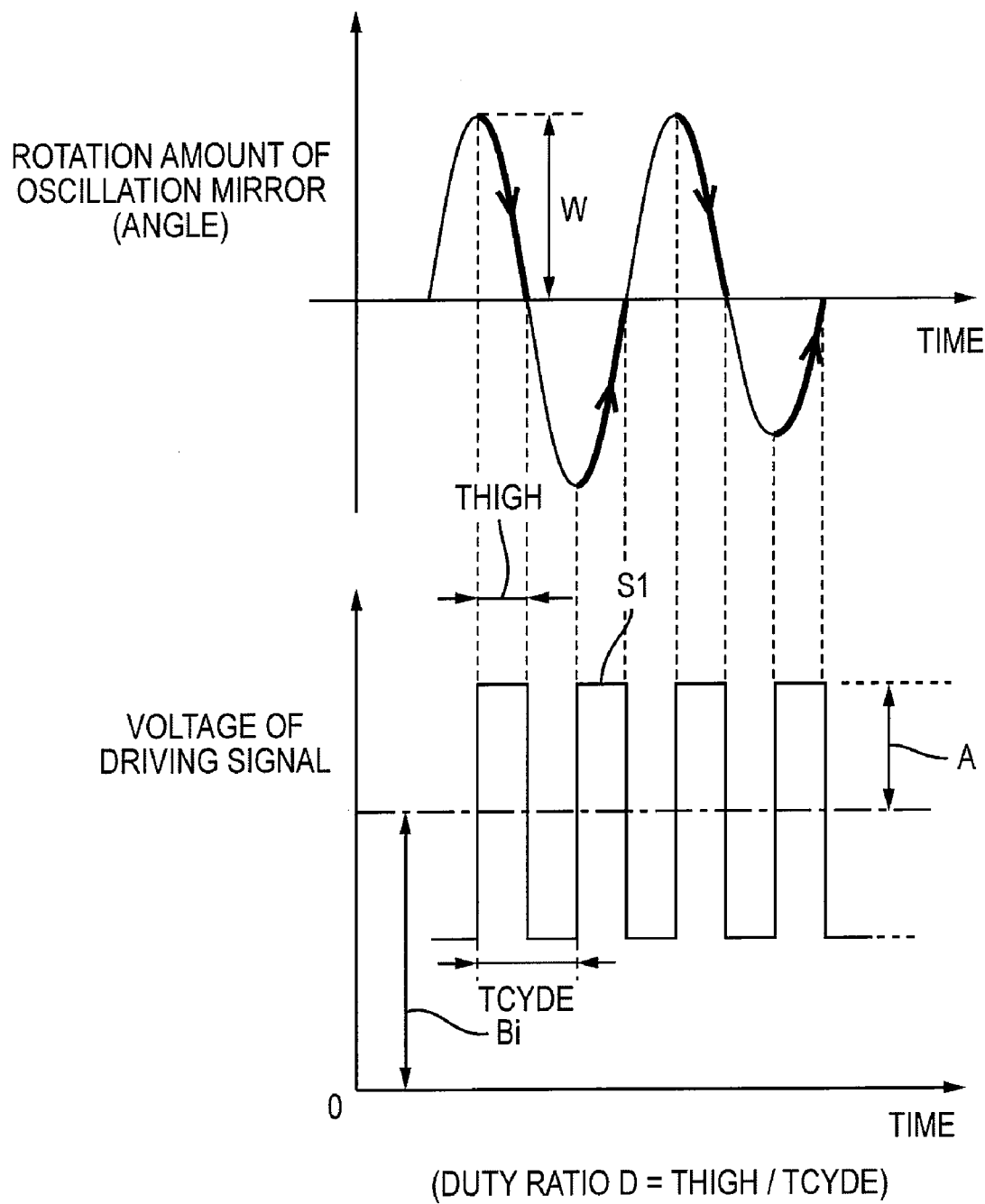
FIG. 4 is a view showing a relationship between an oscillation amplitude of a mirror portion and a waveform of a driving signal according to the first exemplary embodiment.

FIG. 4 is a view illustrating a relationship between the oscillation amplitude W of the mirror portion 63 and the waveform of the driving signal S1. The driving signal S1 has a rectangular waveform which has a high level by a time $T_{high}$ and a low level by a time $T_{low}$ with a frequency f. The high level is obtained by adding an amplitude A to a bias voltage Bi and the low level is obtained by subtracting the amplitude A from the bias voltage Bi. When the oscillation angle of the mirror portion 63 is a certain positive angle (a positive amplitude), for example, the mirror portion 63 is inwardly moved toward the natural position by the restoring force of the support shaft portion 65 which is torsionally deformed. At this time, when the driving signal S1 of a high level is given to the movable electrode 61, an energy is added by an electrostatic force (attractive force) to the inward movement of the mirror portion 63, so that the mirror portion 63 exceeds the natural position to be outwardly moved and the oscillation angle becomes negative. It is noted that the oscillation amplitude W of the oscillating mirror 19 denotes the oscillation amplitude W of the mirror portion 63 as explained above.

When the oscillation angle of the mirror portion 63 is a certain negative angle (a negative amplitude), the mirror portion 63 is inwardly moved toward the natural position by the restoring force of the support shaft portion 65 which is torsionally deformed. At this time, when the driving signal S1 of a high level is given to the movable electrode 61, an energy is added by an electrostatic force (attractive force) to the inward movement of the mirror portion 63. In this way, the mirror portion 63 continues to oscillate in accordance with the frequency of the driving signal S1 (hereinafter, the frequency is referred to as "driving frequency f"), the duty ratio D, the signal amplitude A, and the bias voltage Bi. It is noted that the duty ratio D denotes a ratio of the time of high level $T_{high}$ to a time of one cycle $T_{cycle}$ of the driving signal including the time of high level $T_{high}$ and the time of low level $T_{low}$. That is, the duty ratio D is defined by the expression: $D=T_{high}/T_{cycle}$.

(Driving Circuit)

Figure 5:
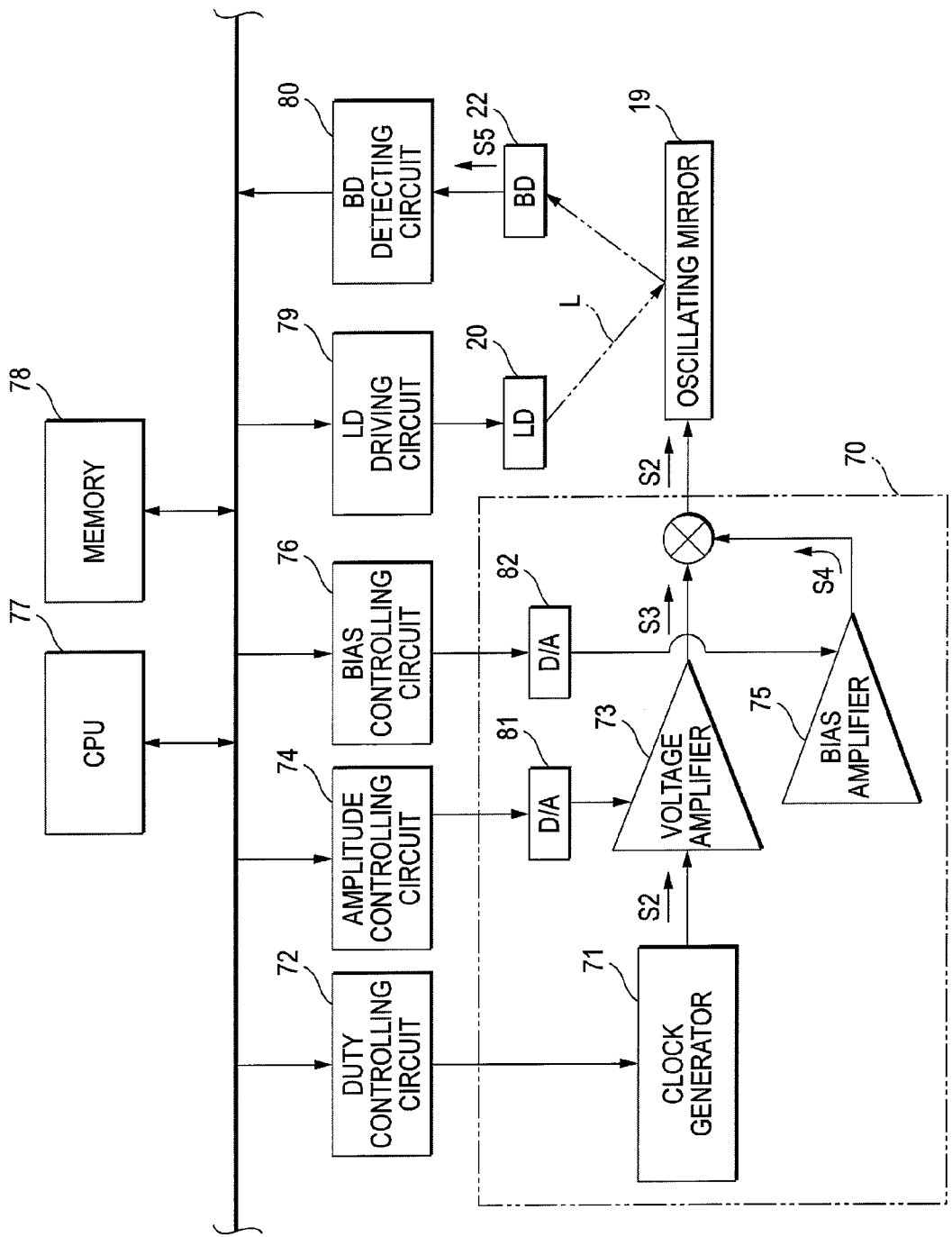
FIG. 5 is a block diagram showing a portion relating to a control of the oscillating mirror according to the first exemplary embodiment.

FIG. 5 is a block diagram showing a portion relating to a control of the oscillating mirror 19. The driving circuit 70 includes a clock generator 71, a voltage amplifier 73, and a bias amplifier 75. The clock generator 71 is configured by, for example, a digital circuit so that the duty ratio D of a clock signal S2 (for example, 0 to 5 V) output from the circuit can be changed by a duty controlling circuit 72.

The voltage amplifier 73 amplifies the voltage of the clock signal S2. The voltage amplifier 73 is configured so that the amplification factor can be changed by an amplitude controlling circuit 74 through a D/A converter 81. The bias amplifier 75 is configured so that the amplification factor can be changed by a bias controlling circuit 76 through a D/A converter 82. The driving signal S1 (for example, 100 to 200 V) is a signal which is obtained by adding an output signal S3 of the voltage amplifier 73 with an output signal S4 of the bias amplifier 75.

The duty controlling circuit 72, the amplitude controlling circuit 74, the bias controlling circuit 76, a CPU 77 which controls these circuits, and a memory 78 (storing unit) are mounted on a control board (not shown) in the laser printer 1. An LD driving circuit 79 which controls an operation of the semiconductor laser 20, and a BD detecting circuit 80 which receives a light receiving signal S5 from the BD sensor 22 are mounted on the control board. Also these circuits are controlled by the CPU 77 and an output of a detection state is input to the CPU 77.

(Parameter)

Even when the driving signal S1 of the same level is given from the driving circuit 70 to the movable electrode 61, for example, the oscillation amplitude W (oscillation angle range) of the oscillating mirror 19 may fluctuate. The reason of this is as follows. The scanning speed of the laser beam is determined according to the target performance of the laser printer 1, and, in accordance with this, the driving frequency of the oscillating mirror 19 is determined. The mirror oscillator 60 is produced so that the driving frequency corresponds to the resonance frequency of the oscillating mirror. Due to production variations, the resonance frequencies of oscillating mirrors 19 may be different from one another. Additionally, when the ambient temperature is changed, the resonance frequency fluctuates. Therefore, the oscillation amplitude W of the oscillating mirror 19 may fluctuate. When the oscillation amplitude W of the oscillating mirror 19 fluctuates, the scan width (scan range) of the laser beam L on the photosensitive member 27 is changed. Therefore, the CPU 77 adjusts the oscillation amplitude W of the oscillating mirror 19 so as to be maintained constant, by means of a feedback control in which the detection time interval of the laser beam L in the BD sensor 22 is compared with a given reference time, which is the detection time interval in the case where the oscillation amplitude W of the oscillating mirror 19 coincides with the target value.

Factors for adjusting the oscillation amplitude W of the oscillating mirror 19 are as follows:

a. the duty ratio D of the driving signal S1 (the duty ratio of the clock signal S2);

b. the bias voltage Bi of the driving signal S1 (the voltage level of the output signal S4 of the bias amplifier 75);

c. the amplitude A of the driving signal S1 (the amplitude of the output signal S3 of the voltage amplifier 73); and d. the driving frequency f of the driving signal S1 (the frequency of the clock signal S2).

Among these factors, it is not advantageous to change the driving frequency f of the driving signal S1 in the laser printer 1, since, if the driving frequency f is changed, the scanning speed of the laser beam L on the photosensitive member 27 is changed, and the speed of conveying the sheet 3 has to be adjusted in accordance with the change. Therefore, it is possible to perform the feedback control for adjusting the oscillation amplitude W of the oscillating mirror 19 by dealing with at least one of the duty ratio D, the bias voltage Bi, and the signal amplitude A as a parameter, and changing the value of the parameter. Hereinafter, the case where the duty ratio D and the bias voltage Bi are dealt with as a parameter will be described as an example.

(Control of Oscillating Mirror)

Figure 6:
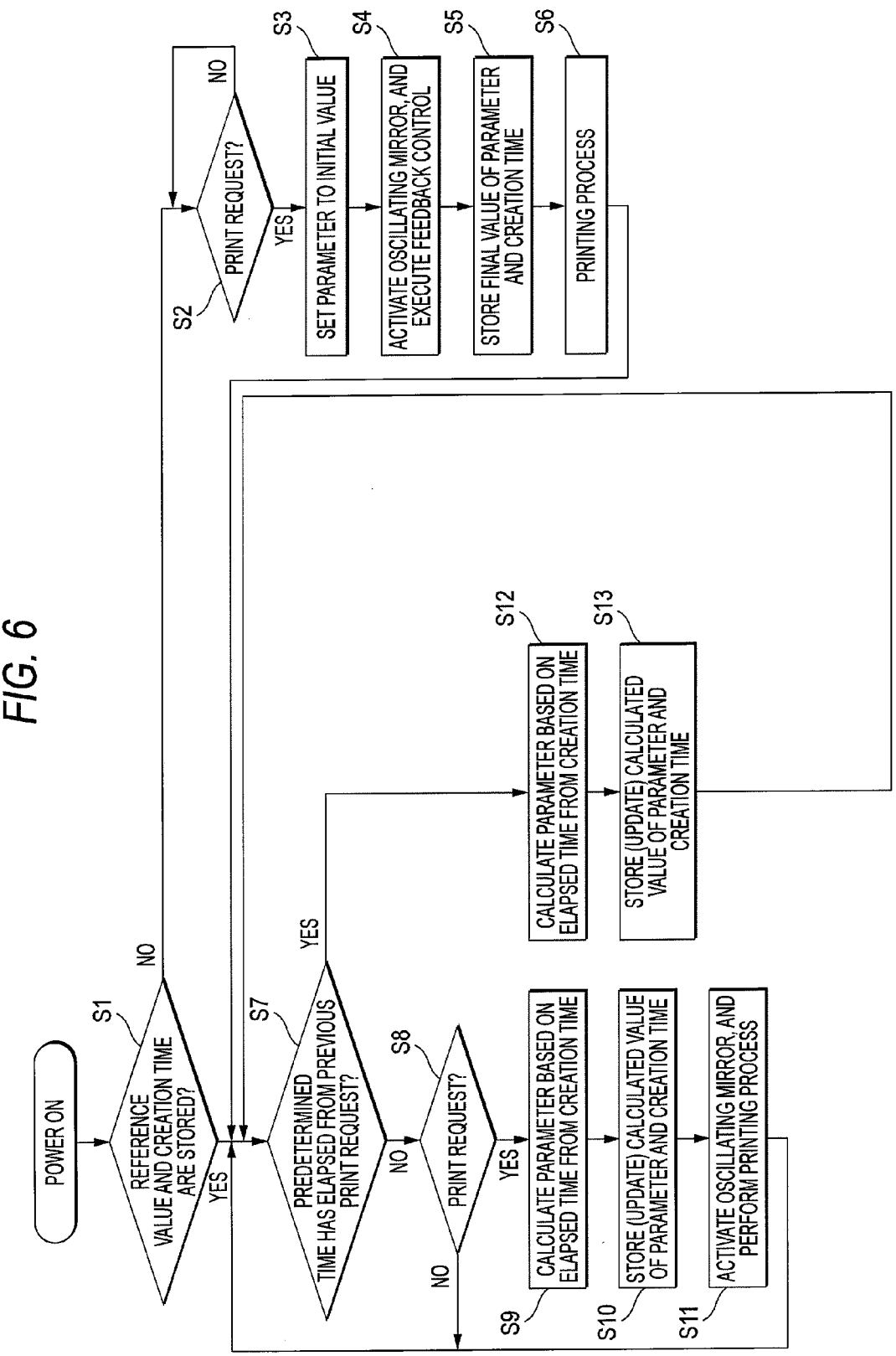
FIG. 6 is a flowchart of process executed by a CPU according to the first exemplary embodiment.

When the laser printer 1 is powered on, the CPU 77 executes the process shown in FIG. 6. First, it is determined whether or not a reference value of the parameter and data of a creation time are stored in the memory 78 in S1.

It is noted that "reference value of parameter" denotes an optimum value of the parameter at a timing when, in the feedback control of the oscillation amplitude W of the oscillating mirror 19, the oscillation amplitude W coincides with the target value. The optimum value may vary according to influences such as the ambient temperature during the feedback control. Therefore, it may be advantageous to set, as the optimum value, an optimum value in the final stage of the feedback control (the optimum value immediately before the end of the feedback control). Additionally, "creation time" denotes a time when the parameter is changed in the feedback control, such as a time when the value of the parameter is changed to the reference value. In the case where the reference value is set to the optimum value in the final stage of the feedback control, the creation time may be the time when the feedback control ends. The CPU 77 functions also as a built-in clock (an example of first and second time measuring units) which counts the time based on a clock signal of a clock generator.

If the reference value of the parameter and data of the creation time are not stored in the memory 78 (S1: No), the process proceeds to S2 which waits the print request (S2: No). When, for example, the printer 1 receives print data from an external information processing apparatus (such as a personal computer), or an operation for a print command is conducted by the user through an operation unit (not shown) of the laser printer 1, the CPU 77 determines that the print request is issued (S2: Yes). Then, the value of the parameter is set to an initial value, which is, for example, a value set before shipment of the laser printer 1, in S3, and the oscillating mirror 19 is activated in S4 and the feedback control is performed so that the oscillation amplitude W becomes coincident with the target value. In this case, the parameter is set to the initial value at first, and hence, it may take a long time to make the oscillation amplitude W of the oscillating mirror 19 coincident with the target value. In other words, the CPU 77 requires a long time to search the optimum value of the parameter at which the oscillation amplitude W coincides with the target value.

When the oscillation amplitude W of the oscillating mirror 19 coincides with the target value, the optimum value of the parameter at this time (more preferably, the optimum value of the final stage of the parameter of the feedback control) is stored into the memory 78 as the reference value of the parameter. Additionally, the creation time of the optimum value of the parameter is stored into the memory 78. Then, the printing unit 5 is controlled so as to execute the printing process such as the exposure on the photosensitive drum 27 by the scanner unit 16, and the image transfer to the sheet 3 in S6. When the printing process ends, for example, the oscillating mirror 19 is stopped, and the heating temperature of the heating roller 41 of the fixing unit 18 is made lower than that during the printing process.

If the reference value of the parameter and data of the creation time are stored in the memory 78 (S1: Yes), it is determined whether or not a second elapsed time which is measured from a previous print request, reaches a predetermined time (for example, 10 to 15 minutes) in S7. If a print request is issued before the second elapsed time reaches the predetermined time (S7: No, S8: Yes), the reference value of the parameter and data of the creation time which are stored in the memory 78 are read out in S9, and the reference value of the parameter (the previous optimum value) is corrected in accordance with a first elapsed time which is measured from the previous creation time to the current time.

Hereinafter, an example of the correcting process of the parameter will be described. As described above, after the printing process ends, the heating temperature of the heating roller 41 of the fixing unit 18 is set to be low, and hence, the ambient temperature of the scanner unit 16 is lowered in accordance with the elapsed time from the previous print request (the previous creation time). As described above, when the ambient temperature changes, the resonance frequency of the mirror oscillator 60 fluctuates. Therefore, also the optimum value of the parameter changes. Specifically, the mirror oscillator 60 used in the first exemplary embodiment oscillates more easily as the temperature is lower, and therefore, the oscillation amplitude W can be made coincident with the target value by the driving signal S1 in which the level is relatively low. By contrast, as the temperature is higher, the mirror oscillator 60 oscillates more hardly, and therefore the oscillation amplitude W can be made coincident with the target value, only by the driving signal S1 in which the level is relatively high. For example, tendencies of the first elapsed time from the previous creation time and the temperature change, and the optimum value of the parameter at each temperature are previously obtained from experiments, and a data table of correspondence between the first elapsed time and the optimum value of the parameter is prepared and stored into the memory 78. Then, the optimum value corresponding to the current first elapsed time is extracted from the correspondence table. Alternatively, a correction function (for example, a proportional function) may be derived based on the correlation in the correspondence between the first elapsed time and the optimum value of the parameter, and the reference value (the previous optimum value) of the parameter stored in the memory 78 may be corrected based on the first elapsed time and the correction function. In the case where the first elapsed time or the second elapsed time is very short, the correction may not be performed. After S9 is performed, the process proceeds to S10.

In S10, the optimum value which is corrected in S9 is stored (updated) in the memory 78 as a new optimum value, and the time of the correction is stored (updated) into the memory 78 as a new creation time. In S11, the oscillating mirror 19 is activated, the feedback control is started with the latest reference value of the parameter which is updated in S10, and the printing process is performed. The latest reference value of the parameter is close to the optimum value under the current ambient temperature. Therefore, as compared with the case where the feedback control is started with the initial value of the parameter (S4), the oscillation amplitude W of the oscillating mirror 19 can be made coincident with the target value earlier.

If the print request is not issued even when the second elapsed time from the previous print request reaches the predetermined time (an example of the case where the oscillating mirror is not reactivated by timing when the second elapsed time reaches the predetermined time) (S7: Yes, S8: No), a process similar to S9 and S10 which have been described above is performed even when the print request is not issued, and the reference value of the parameter is corrected to the optimum value with respect to the latest ambient temperature. According to the configuration, when the print request is next issued, the oscillation amplitude W of the oscillating mirror 19 can be made coincident with the target value earlier. However, the printing process is not performed because the print request is not issued.

It is noted that if the driving circuit 70 for the oscillating mirror 19 would drive to continue the feedback control also in the state of waiting for the print request, the oscillation amplitude W of the oscillating mirror 19 can be made coincident with the target value earlier in response to the print request. However, this is disadvantageous in that the power consumption increases. By contrast, in the first exemplary embodiment, the driving circuit 70 is stopped in the state of waiting for the print request, and hence, the power consumption can be suppressed.

Second Exemplary Embodiment

Figure 7:
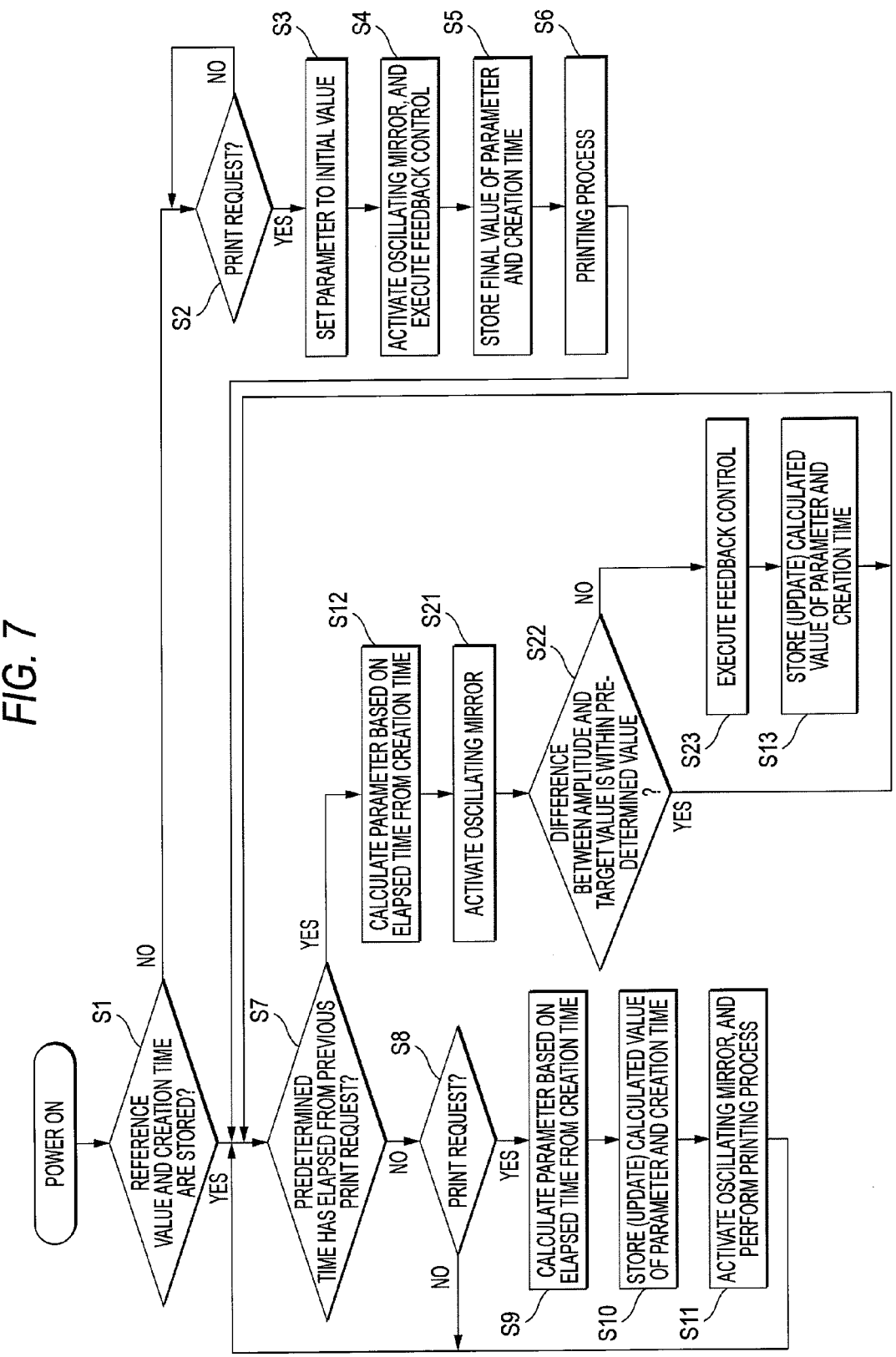
FIG. 7 is a flowchart of process executed by a CPU according to a second exemplary embodiment of the present invention.

FIG. 7 is a flowchart of process executed by a CPU 77 according to a second exemplary embodiment of the present invention. The second exemplary embodiment is identical with the first exemplary embodiment except for the process executed by the CPU 77. Therefore, the same reference numerals as in the first exemplary embodiment are used for describing the second exemplary embodiment, overlap description is omitted, and only different portions will be described.

In FIG. 7, S21 to S23 are added between S12 and S13 of FIG. 6. Namely, if the print request is not issued even when the second elapsed time from the previous print request reaches the predetermined time (S7: Yes, S8: No), the reference value of the parameter is corrected in S12 to the optimum value with respect to the latest ambient temperature although the print request is not issued. And the process proceeds to S21.

In S21, the corrected optimum value of the parameter is set as a fixed value, and the oscillating mirror 19 is activated. In this case, the feedback control is not performed. In S22, it is determined whether the difference between the oscillation amplitude W and the target value is within a predetermined value (including zero). If the difference is within the predetermined value (S22: Yes), the previous reference value of the parameter is stored into the memory 78 as it is or without being corrected. Alternatively, the optimum value which is corrected in S12 may be stored into the memory 78 as a new reference value of the parameter.

By contrast, in S22, if it is determined that the difference between the oscillation amplitude W and the target value exceeds the predetermined value (S22: No), the feedback control is started in S23. When the oscillation amplitude W of the oscillating mirror 19 is coincident with the target value, the optimum value of the parameter at this time (more preferably, the optimum value of the parameter in the final stage of the feedback control) is stored into the memory 78 as a new reference value of the parameter, and the creation time of the optimum value of the parameter is stored into the memory 78 in S13.

When the elapsed time from the previous print request to the next print request is excessively prolonged, the difference in the operation state of the laser printer 1 and the ambient temperature of the scanner unit 16 becomes large, and hence, there may arise a problem in that, when the next print request is issued, the optimum value cannot be calculated by the correcting process. This problem is notably caused particularly when a power saving function is exerted. The power saving function denotes a function of, when the state of waiting for the print request is continued for a certain time (for example, five minutes), transferring the control to a so-called sleep state in which the power consumption is reduced. In the sleep state, for example, the heating temperature of the heating roller 41 of the fixing unit 18 is made lower than that in the state of waiting for the print request. When the print requested is issued in the sleep state, therefore, the ambient temperature and the like are largely different from those in the previous print request.

Therefore, the second exemplary embodiment is configured so that the oscillating mirror 19 is actually actuated in S21 to S23, and the optimum value of the parameter is again obtained. A configuration in which S12 of FIG. 7 is omitted may be possible. However, by adding S12, the oscillation amplitude W of the oscillating mirror 19 can be made coincident with the target value earlier in the feedback control of S23.

Other Exemplary Embodiments

While the present invention has been shown and described with reference to certain exemplary embodiments thereof, it will be understood by those skilled in the art that various changes in form and details may be made therein without departing from the spirit and scope of the invention as defined by the appended claims. For example, also the following exemplary embodiments fall within the technical scope of the invention.

(1) "Optical scanning device" may be installed on a display apparatus, a projector, and a scanner (image reading apparatus) which are of the laser scan type, and the like, in place of the scanner unit 16 which is used in the laser printer 1 as in the above-described exemplary embodiments. In the case of an apparatus other than a laser printer, the driving frequency may be used as a parameter. In this case, for example, the clock generator 71 is configured so as to output plural clock signals of different driving frequencies.

(2) "Driving signal" may have, for example, a trapezoidal waveform in place of a rectangular waveform. Further, the driving signal may have any waveform such as sinusoidal wave, triangle wave or the like.

(3) Unlike the above-described exemplary embodiments, the movable electrode 61 may be grounded, and the pulse-like driving signal S1 may be given to the stationary electrode 62. Alternatively, a pulse-like driving signal may be given to both the movable electrode 61 and the stationary electrode 62.

(4) The exemplary embodiments are configured so that the reference value of the parameter is corrected based on the elapsed time from the previous print request. The present invention is not limited thereto. For example, a configuration in which a temperature sensor is disposed and correction is performed based on the detected temperature may be employed.

(5) From the process as shown in FIG. 6, S7, S12, and S13 may be omitted and the control waits until the print request is issued, irrespective of the elapsed time.

(6) The memory 78 may be formed by a nonvolatile memory or a volatile memory that can be backed up. Even when the laser printer 1 is powered off, the CPU 77 may measure the first and second elapsed times.

The present invention provides illustrative, non-limiting embodiments as follows:

An optical scanning device comprises: an oscillating mirror which has a pair of electrodes and a mirror oscillator, and which deflects a light beam; a driving unit which applies a wave-like driving signal to the pair of electrodes so as to oscillate the mirror oscillator by an electrostatic force corresponding to the driving signal; a detecting unit which detects an oscillation amplitude of the oscillating mirror; an adjusting unit which changes a value of at least one of a duty ratio, a driving frequency, an amplitude, and a bias voltage of the driving signal as a parameter so as to adjust the oscillation amplitude detected by the detecting unit to a target value; and a storing unit which stores the value of the parameter changed by the adjusting unit as a reference value. When the oscillating mirror is activated, the adjusting unit starts the adjusting of the oscillation amplitude with using the driving signal based on the reference value stored in the storing unit.

According to the above configuration, the storing unit stores the value of the parameter which is changed in order to adjust the oscillation amplitude of the oscillating mirror to the target value, as the reference value. When thereafter the drive for oscillating the oscillating mirror is once stopped and then restarted, the adjustment of the oscillation amplitude of the oscillating mirror is restarted according to the driving signal based on the reference value. Therefore, as compared with a related-art device in which the adjustment is started according to a driving signal based on a reference value which is always fixed, oscillation during activation of the oscillating mirror can stabilize earlier.

The optical scanning device according may further comprise a first time measuring unit which measures a first elapsed time since the parameter is changed to the reference value to be stored in the storing unit. When the oscillating mirror is activated, the adjusting unit may correct the reference value stored in the storing unit based on the first elapsed time and starts the adjusting of the oscillation amplitude with using the driving signal based on the corrected reference value.

According to the above configuration, the first elapsed time since the parameter has a value equal to the reference value causes the ambient temperature of the oscillating mirror to be changed. Therefore, it may be advantageous that the reference value stored in the storing unit is corrected based on the first elapsed time, and the adjustment of the amplitude is started according to the driving signal based on the corrected reference value.

The optical scanning device may further comprise a second time measuring unit which measures a second elapsed time from a previous activating request to activate the oscillating mirror. If the oscillating mirror is not reactivated by a time when the second elapsed time reaches a predetermined time, the adjusting unit may correct the reference value stored in the storing unit based on the first elapsed time and the storing unit stores the corrected reference value as a new reference value.

According to the above configuration, in the case where the oscillating mirror is not reactivated by time when the predetermined time elapses from the previous activating request, a considerable time has elapsed since time when, in the process of adjustment by the adjusting unit, the parameter is set to the reference value which is currently stored in the storing unit, and hence there is a possibility that the ambient temperature is largely changed. Therefore, it may be advantageous that, even when the oscillating mirror is not activated, the reference value stored in the storing unit is corrected based on the first elapsed time, and the corrected value is stored as a new reference value.

A printing apparatus comprises: a photosensitive member; an optical scanning device which is activated in response to a print request, the optical scanning device comprising: an oscillating mirror which has a pair of electrodes and a mirror oscillator, and which deflects a light beam to be exposed on the photosensitive member; a driving unit which applies a wave-like driving signal to the pair of electrodes so as to oscillate the mirror oscillator by an electrostatic force corresponding to the driving signal; a detecting unit which detects an oscillation amplitude of the oscillating mirror; an adjusting unit which changes a value of at least one of a duty ratio, a driving frequency, an amplitude, and a bias voltage of the driving signal as a parameter so as to adjust the oscillation amplitude detected by the detecting unit to a target value; and a storing unit which stores the value of the parameter changed by the adjusting unit as a reference value, wherein when the oscillating mirror is activated, the adjusting unit starts the adjusting of the oscillation amplitude with using the driving signal based on the reference value stored in the storing unit; a printing unit which forms an image on the exposed photosensitive member and transfer the image to a recording medium; a time measuring unit which measures an elapsed time from a previous print request; a controller which controls the driving unit to apply the driving signal based on the reference value stored in the storing unit to oscillate the oscillating mirror when a new print request is not issued by a time when the elapsed time reaches a predetermined time; and a determining unit which determines whether a difference between the oscillation amplitude detected by the detecting unit and the target value is a predetermined value or more, wherein if it is determined that the difference is more than the predetermined value, the adjusting unit starts the adjusting of the oscillation amplitude and the storing unit stores the value of the parameter changed in the adjusting of the oscillation amplitude after the determination as a new reference value.

According to the above configuration, In the case where the print request is not issued by a time when the predetermined time elapses from the previous print request, a considerable time has elapsed since timing when, in the process of adjustment by the adjusting means, the parameter is set to the reference value which is currently stored in the storing unit, and hence there is a possibility that the ambient temperature is largely changed. Therefore, the oscillating mirror is once oscillated by the driving signal based on the reference value which is stored in the storing unit. In the case where, the difference between the amplitude detected at this time and the target value is equal to or larger than the predetermined value, preferably, the adjustment of the adjusting means is restarted, and the parameter value at this time is stored as a new reference value. In the case where the difference between the amplitude and the target value is smaller than the predetermined value, preferably, the adjustment of the adjusting means is not restarted, and the reference value which is already stored in the storing means is not changed (updated).

What is claimed is:

1. An optical scanning device comprising:
an oscillating mirror which has a pair of electrodes and a mirror oscillator, and which deflects a light beam;
a driving unit which applies a wave-like driving signal to the pair of electrodes so as to oscillate the mirror oscillator by an electrostatic force corresponding to the driving signal;
a detecting unit which detects an oscillation amplitude of the oscillating mirror;
an adjusting unit which changes a value of at least one of a duty ratio, a driving frequency, an amplitude, and a bias voltage of the driving signal as a parameter so as to adjust the oscillation amplitude detected by the detecting unit to a target value; and
a storing unit which stores the value of the parameter changed by the adjusting unit as a reference value,
wherein when the oscillating mirror is activated, the adjusting unit starts the adjusting of the oscillation amplitude with using the driving signal based on the reference value stored in the storing unit.

2. The optical scanning device according to claim 1, further comprising a first time measuring unit which measures a first elapsed time since the parameter is changed to the reference value to be stored in the storing unit,
wherein when the oscillating mirror is activated, the adjusting unit corrects the reference value stored in the storing unit based on the first elapsed time and starts the adjusting of the oscillation amplitude with using the driving signal based on the corrected reference value.

3. The optical scanning device according to claim 2, further comprising a second time measuring unit which measures a second elapsed time from a previous activating request to activate the oscillating mirror,
wherein if the oscillating mirror is not reactivated by a time when the second elapsed time reaches a predetermined time, the adjusting unit corrects the reference value stored in the storing unit based on the first elapsed time and the storing unit stores the corrected reference value as a new reference value.

4. A printing apparatus comprising:
a photosensitive member;
an optical scanning device which is activated in response to a print request, the optical scanning device comprising:
an oscillating mirror which has a pair of electrodes and a mirror oscillator, and which deflects a light beam to be exposed on the photosensitive member;
a driving unit which applies a wave-like driving signal to the pair of electrodes so as to oscillate the mirror oscillator by an electrostatic force corresponding to the driving signal;
a detecting unit which detects an oscillation amplitude of the oscillating mirror;
an adjusting unit which changes a value of at least one of a duty ratio, a driving frequency, an amplitude, and a bias voltage of the driving signal as a parameter so as to adjust the oscillation amplitude detected by the detecting unit to a target value; and
a storing unit which stores the value of the parameter changed by the adjusting unit as a reference value,
wherein when the oscillating mirror is activated, the adjusting unit starts the adjusting of the oscillation amplitude with using the driving signal based on the reference value stored in the storing unit; and
a printing unit which forms an image on the exposed photosensitive member and transfer the image to a recording medium.

5. The printing apparatus according to claim 4, further comprising: a time measuring unit which measures an elapsed time since the parameter is changed to the reference value to be stored in the storing unit,
wherein when the oscillating mirror is activated, the adjusting unit corrects the reference value stored in the storing unit based on the elapsed time and starts the adjusting of the oscillation amplitude with using the driving signal based on the corrected reference value.

6. The printing apparatus according to claim 4, further comprising:
a time measuring unit which measures an elapsed time from a previous print request;
a controller which controls the driving unit to apply the driving signal based on the reference value stored in the storing unit to oscillate the oscillating mirror when a new print request is not issued by a time when the elapsed time reaches a predetermined time; and
a determining unit which determines whether a difference between the oscillation amplitude detected by the detecting unit and the target value is a predetermined value or more, wherein if it is determined that the difference is more than the predetermined value, the adjusting unit starts the adjusting of the oscillation amplitude and the storing unit stores the value of the parameter changed in the adjusting of the oscillation amplitude after the determination as a new reference value.

7. An optical scanning device comprising:
an oscillating mirror which oscillates rotationally;
a driving unit which applies a driving signal to the oscillating mirror to oscillate;
a detecting unit which detects an oscillation amplitude of the oscillating mirror;
a controller which controls a waveform of the driving signal to adjust the oscillation amplitude of the oscillating mirror to a target value based on a detection result of the detecting unit;
a storing unit which stores a waveform data indicating the waveform of the driving signal which is obtained in the control by the controller, as a reference data;
a receiving unit which receives a control start command and a control stop command,
wherein, in response to the control start command, the controller starts controlling of the waveform of the driving signal to adjust the oscillation amplitude, based on the reference data stored in the storing unit.

8. The optical scanning device according to claim 7, further comprising a time measuring unit which measures a time period from a time when the waveform of the driving signal to be stored in the storing unit is obtained in the control by the controller,
wherein the controller corrects the waveform data stored in the storing unit based on the time period measured by the time measuring unit.

9. The optical scanning device according to claim 8, further comprising an obtaining unit which obtains a correction amount in the correction by the controller based on the time period measured by the time measuring unit.

10. The optical scanning device according to claim 9,
wherein the obtaining unit comprises a memory which stores a table, in which the time period measured by the time measuring unit is associated with the correction amount.

11. The optical scanning device according to claim 7,
wherein the storing unit stores the waveform data indicating the waveform of the driving signal when the controller stops controlling of the waveform of the driving signal in response to the control stop command.

12. The optical scanning device according to claim 11, further comprising a time measuring unit which measures a time period from a time when the control stop command is received, wherein the controller corrects the waveform data stored in the storing unit based on the time period measured by the time measuring unit.

13. The optical scanning device according to claim 7, further comprising a sensor which senses a temperature around the oscillating mirror;

wherein the controller corrects the waveform data stored in the storing unit based on the temperature sensed with the sensor.

\* \* \* \* \*